(12) United States Patent
Otto et al.

(10) Patent No.: US 10,220,727 B2
(45) Date of Patent: Mar. 5, 2019

(54) SYSTEM AND METHOD FOR CONTROLLING SEAT MOVEMENT USING MAGNETIC SENSING

(71) Applicant: GM GLOBAL TECHNOLOGY OPERATIONS LLC, Detroit, MI (US)

(72) Inventors: William Otto, Lake Orion, MI (US); Alexander N. Ballios, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 194 days.

(21) Appl. No.: 15/332,967

(22) Filed: Oct. 24, 2016

(65) Prior Publication Data

US 2018/0111509 A1  Apr. 26, 2018

(51) Int. Cl.
| | | |
|---|---|---|
| *B60N 2/02* | (2006.01) | |
| *B60N 2/806* | (2018.01) | |
| *B60N 2/22* | (2006.01) | |
| *G01D 5/20* | (2006.01) | |
| *G01D 5/14* | (2006.01) | |

(52) U.S. Cl.
CPC ......... *B60N 2/0232* (2013.01); *B60N 2/0248* (2013.01); *B60N 2/22* (2013.01); *B60N 2/806* (2018.02); *G01D 5/147* (2013.01); *G01D 5/20* (2013.01); *B60N 2002/0268* (2013.01)

(58) Field of Classification Search
CPC .... B60R 2021/022; B60R 2021/23146; B60R 22/26; B60N 2/24; B60N 2/427; B60N 2/0232; B60N 2/42736; B60N 2/806
USPC .......... 701/49; 296/68.1, 63, 64; 280/730.2; 297/216.17, 216.1
See application file for complete search history.

(56) References Cited

U.S. PATENT DOCUMENTS

| | | | | |
|---|---|---|---|---|
| 2003/0141862 A1* | 7/2003 | Vig | ......................... | G01D 5/145 324/174 |
| 2005/0225317 A1* | 10/2005 | Freeman | .............. | B60N 2/0705 324/207.2 |
| 2011/0254539 A1* | 10/2011 | Saini | .................... | B60N 2/0705 324/207.2 |
| 2017/0197522 A1* | 7/2017 | Lopez Pinana | ........ | B60N 2/806 |

* cited by examiner

*Primary Examiner* — Dalena Tran
(74) *Attorney, Agent, or Firm* — Lorenz & Kopf, LLP

(57) ABSTRACT

An improved system and method for controlling a moveable object associated with a mobile platform are provided. The provided system and method generates an application specific protected volume between the moveable object and a feature of the mobile platform to be protected. The provided system and method use magnetic sensing techniques to sense the moveable object when it infringes upon the protected volume, and provide control of the moveable object responsive to sensed infringement.

14 Claims, 4 Drawing Sheets

SYSTEM AND METHOD FOR CONTROLLING SEAT MOVEMENT USING MAGNETIC SENSING

TECHNICAL FIELD

The technical field generally relates to mobile platform management systems, and specifically relates to a system and related operating methods for controlling seat movement using magnetic sensing.

BACKGROUND

Many mobile platform designs include one or more moveable objects (for example a steering wheel and a seat). The moveable object may be articulated, comprising multiple components, each of which is capable of movement along various planes or coordinates. Configuring the moveable object generally involves moving each of the components, either independently or jointly. While the movement of each of the individual components may be limited to a finite amount of travel, in various configurations of the moveable object, movement in multiple axis' at the same time can result in undesirable contact between the moveable object and features of the mobile platform.

In the example of a vehicle seat, in order to configure the seat to maximize user comfort and sitting space, a user may utilize mechanisms (for example, power seat controls or levers) to cause the seat to move or travel, and the travel may cause the seat to contact a protected feature or area in the mobile platform. The protected feature or area may be the bulkhead or trim behind the seat, and over time, repeated contact may mar or damage the bulkhead. In order to minimize this contact, many mobile platform designs employ pressure sensors. However, pressure sensor designs tend to provide reactionary (i.e., post contact) notification or provide notification that contact is about to happen too late for use in the control of the movement causing the contact.

Accordingly, improved systems and methods for controlling a moveable object associated with a mobile platform are desired. Furthermore, other desirable features and characteristics of the present invention will be apparent from the subsequent detailed description and the appended claims, taken in conjunction with the accompanying drawings and the foregoing technical field and background.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

Provided is a method for controlling movement of a seat in a vehicle, the method comprising: generating, by a magnetic sensor module within the vehicle, a protected volume of magnetic flux extending from a reference wall in the vehicle toward the seat by a predetermined depth; sensing, by the magnetic sensor module, infringement on the protected volume by the seat; and controlling, by the magnetic sensor module, movement of the seat responsive to the sensed infringement.

Also provided is a system for controlling a moveable object in a mobile platform, the system comprising: a magnetic sensor assembly mounted to a reference wall of the mobile platform, the magnetic sensor assembly configured to generate a protected volume of magnetic flux, the protected volume extending forward from a surface of the reference wall by a predetermined depth; and sense infringement upon the protected volume by a ferrous target associated with the moveable object; and a control module coupled to the magnetic sensor assembly and to the moveable object, and configured to control movement of the moveable object responsive to the sensed infringement.

Another method for controlling a moveable object is provided, the movable object associated with a mobile platform, the method comprising: generating, by a magnetic sensor assembly, a protected volume of magnetic flux within the mobile platform, wherein the (i) dimensions and (ii) location of the protected volume are based on predicted movement of the moveable object; sensing, by the magnetic sensor assembly, infringement on the protected volume by a ferrous target; and controlling, by a control module coupled to the magnetic sensor assembly, a mechanism configured to cause the moveable object to move, responsive to the sensed infringement.

Other desired features will become apparent from the following detailed description and the appended claims, taken in conjunction with the accompanying drawings and this background.

DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

Figure 1:
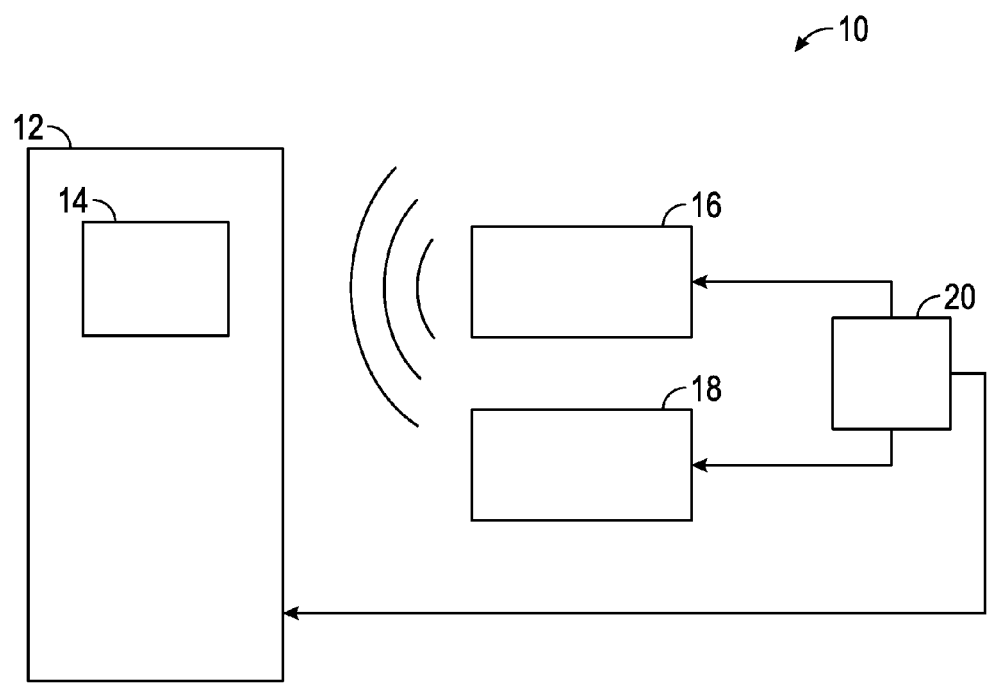
FIG. 1 is a block diagram of a system for controlling movement of a moveable object.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented.

In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory devices, digital signal processing elements, logic elements, look-up tables, or the like, which may carry out a variety of functions under the control of one or more microprocessors or other control devices.

As used herein, "memory device" comprises any combination of processor-readable or computer-readable storage mediums, which can be realized in a non-transitory and tangible form. The "processor-readable medium" or "machine-readable medium" may include any medium that can store or transfer information. Examples of the processor-readable medium include an electronic circuit, a semiconductor memory device, a RAM, a ROM, a flash memory, an erasable ROM (EROM), a floppy diskette, a removable disk, a CD-ROM, an optical disk, a hard disk, In various embodiments, the memory device may be integral to a respective processor. Memory devices may store non-transitory computer readable instructions and program code for operating the below described system, and the functional or logical module/components of the below described system. Also used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory device that executes one or more software or firmware programs, a combinational logic circuit, and/or other suitable components that provide the described functionality.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject.

As a simplified overview, the provided system and method control movement of a moveable object in response to magnetically sensed infringement upon a protected volume by the moveable object. The protected volume comprises magnetic flux, and the moveable object has an associated ferrous target that interferes with or alters the magnetic flux during infringement. In response to the sensed infringement, the provided system and method controls a mechanism that causes movement of the moveable object. For the purpose of illustration, the following examples depict a seat of a mobile platform such as a vehicle; however, the concepts presented herein can be deployed in other mobile platforms, such as aircraft, spacecraft, watercraft, motorcycles, scooters, robots, robotic devices, and the like. Similarly, the moveable object may take forms other than a seat. Moreover, the concepts presented herein may also be deployed in non-mobile platform applications if so desired. Rotated in three dimensions, the magnetic flux loop becomes at least a part of the defined three-dimensional space. Accordingly, the characteristics of the magnet are selected to generate a three-dimensional space with characteristics required by a given application, such as the dimensions and magnetic flux density. In addition, the given application may require any number of magnets; where the number and arrangement of magnets employed are based on the desired dimensions and magnetic flux density of the desired three-dimensional space.

Turning now to example embodiments, in FIG. 1, a system 10 for controlling movement of a moveable object 12 is shown (hereinafter "system 10"). The system 10 includes at least one target 14, a magnetic flux generation device 16, an interference sensor device 18, and a control module 20. The magnetic flux generation device 16 is configured to generate a magnetic flux that fills a defined three-dimensional space. For example, the magnetic flux generation device 16 may include, or operate through, matter. In addition, certain terminology may also be used in the following description for the purpose of reference only, and thus are not intended to be limiting.

The target 14 is configured to cause interference in the magnetic flux. For example, the target 14 can comprise a ferrous material or other material that, when placed in proximity to or within the magnetic flux, causes an observable interference or alteration in the magnetic flux. A size, shape, and location of the target 14 may be application specific and may be based on dimensions and density of the magnetic flux within the protected volume 106.

The interference sensor device 18 is configured to observe or sense the magnetic flux generated by the flux generation device 116 and convert sensed disturbances in the magnetic flux into generated sensor signals for use by control module 20. For example, the interference sensor device 18 may include a Hall Effect sensor, Anisotropic Magneto resistive (AMR) Whetstone bridge sensors, or other magnetically sensitive devices including Giant Magneto Resistive (GMR) sensors, Tunnel Magneto Resistive (TMR) sensors, and Extraordinary Magneto Resistive (EMR) sensors.

In various embodiments, the interference sensor device 18 generates a sensor signal having a first value responsive to sensing the observed magnetic flux without interference and generates a sensor signal having a second value (or varying values) responsive to sensing one or more interferences in the magnetic flux. In various embodiments, the interference sensor device 18 is configured to have a sensitivity (of the sensing and converting) that is application specific, and may be based on the number, location, and dimensions, of the one or more targets 14 The sensitivity of the interference sensor device 18 may further be based on predicted velocity of movement of the moveable object in the course of normal operation. As can be appreciated, the sensor signals of the interference sensor device 18 are based on the sensed infringement, and may be accurately decoded even in the presence of common-mode noise or amplitude changes caused by magnetic field losses due to temperature variation, decay of a magnet, etc.

The control module 20 is configured to receive the sensor signals and to control movement of the moveable object based thereon. For example, the control module 20 is configured to generate control signals to the moveable object sufficient to stop or slow movement of the moveable object 12 when the sensor signals fall within a predetermined value or range of values.

In various embodiments, the magnetic flux generation device 16 and the interference sensor device 18 may be implemented as separate elements or as an assembly of the elements (hereinafter referred to as a magnetic sensor assembly 104), and the magnetic sensor assembly 104 may further be integrated with the control module 20 (hereinafter referred to as a magnetic sensor module 122).

Figure 2:
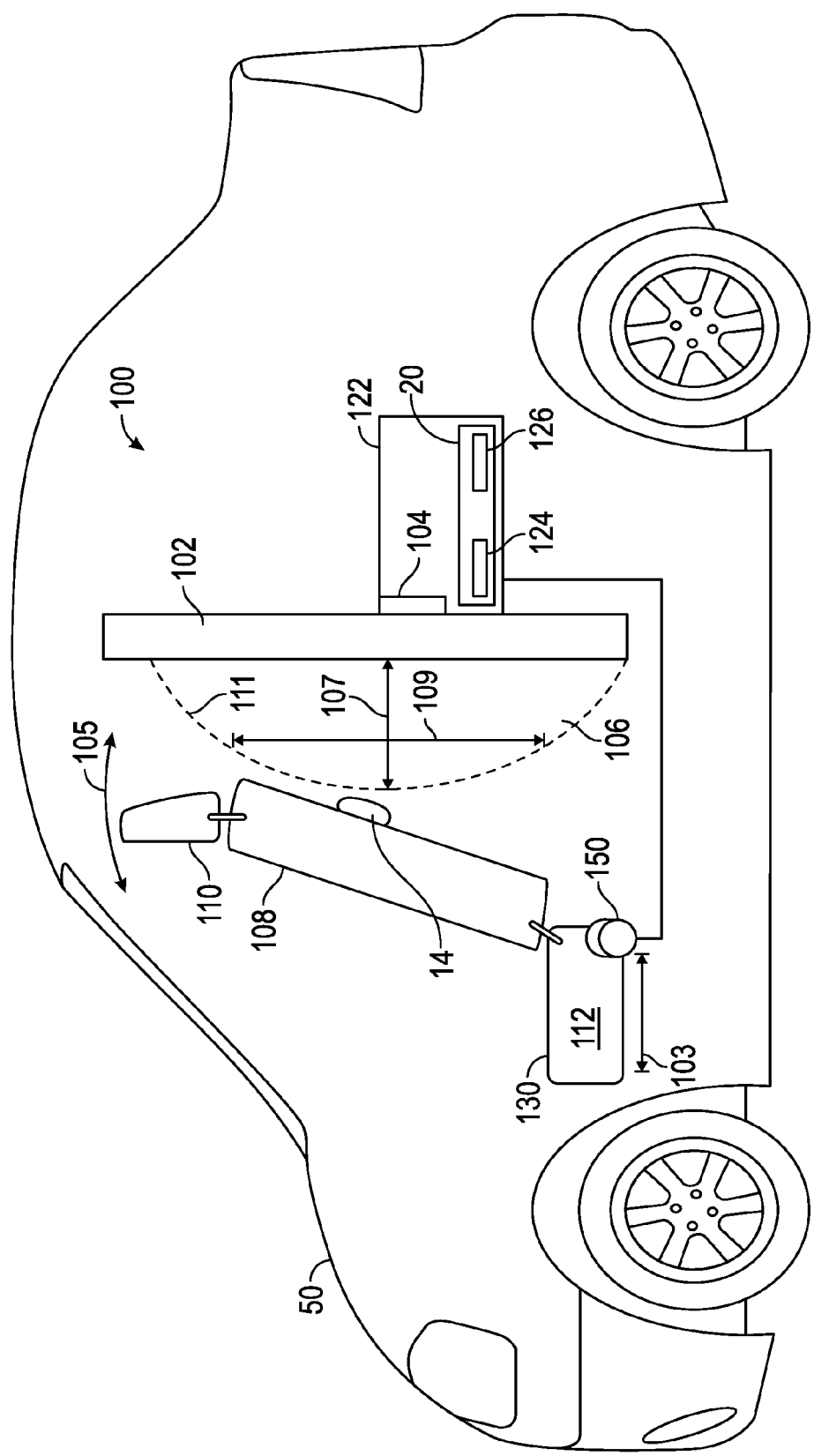
FIG. 2 is a side perspective view of a moveable object and a system for controlling movement of the moveable object, the view showing the moveable object not infringing upon a protected volume, in accordance with various exemplary embodiments.
Figure 4:
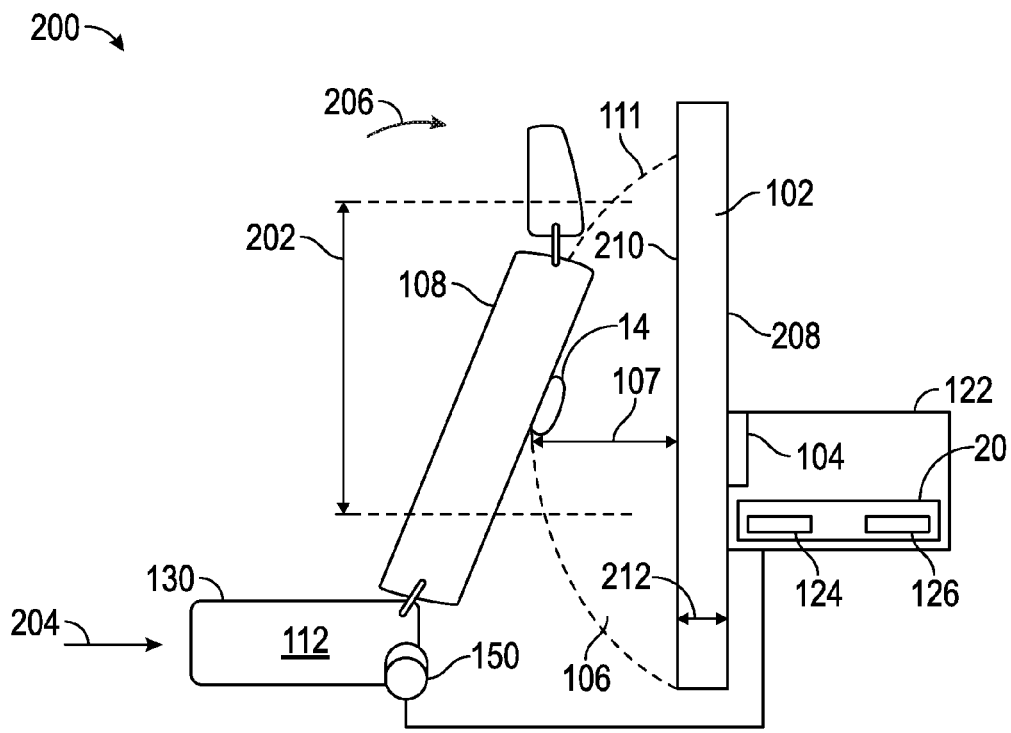
FIG. 4 is an illustration of an exemplary moveable object such as a seat having an identified target zone and several ferrous targets, in accordance with various exemplary embodiments.
Figure 3:
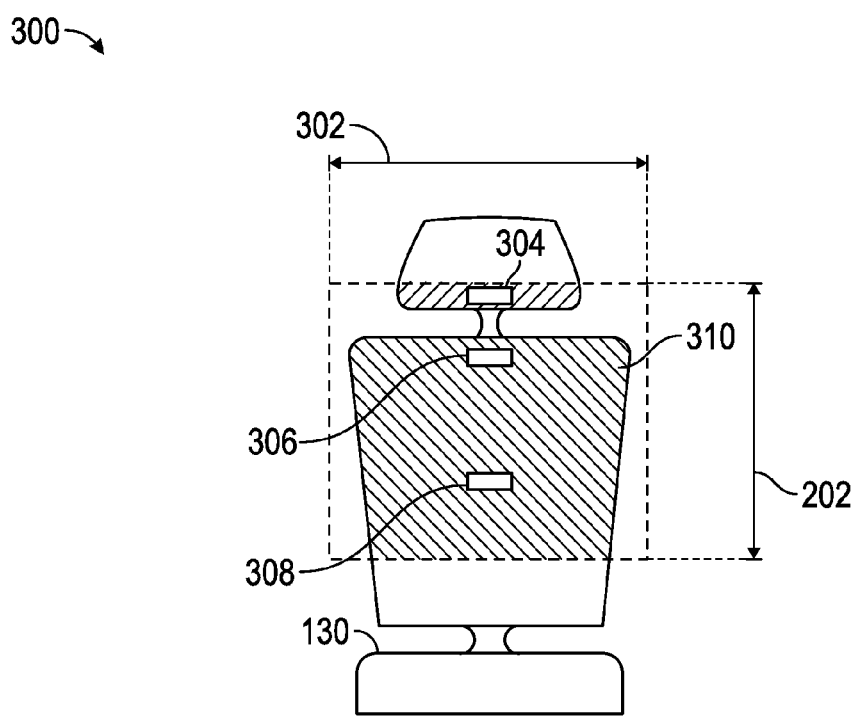
FIG. 3 is a side perspective view of the moveable object and the system for controlling movement of the moveable object, the view showing the moveable object infringing upon the protected volume, in accordance with various exemplary embodiments.

Turning now to FIGS. 2, 3, and 4, the system 10 is shown to be associated with a seat 130 of a vehicle 50. As shown, the magnetic sensor assembly 104 may be located on a reference feature of the vehicle 50 that is to be protected from contact by the seat 130. In FIG. 2 and FIG. 3, an exemplary reference feature to be protected is a portion of stationary trim, such as a bulkhead, denoted by reference wall 102. Reference wall 102 is depicted comprising one or more material(s) with respective thicknesses 212, each being application specific. In various embodiments, the magnetic sensor assembly 104 may be mounted on a first side 208 of the reference wall 102, and generate, through the material and thickness 212 of the reference wall 102, a protected volume 106 of magnetic flux, which extends forward or outward from a second side 210 of the reference wall 102. The protected volume 106 may also be described as extending toward the seat 130 from the second side 210 of the reference wall 102. In an alternate embodiment, the magnetic sensor assembly 104 may be mounted on the seat 130, and generate protected volume 106 of magnetic flux backward, toward the reference wall 102, wherein the one or more targets may be mounted. Regardless of where the magnetic sensor assembly 104 is located and/or mounted within the vehicle 50, the system 10 is configured to meet the operational requirements described herein.

While the protected volume 106 is depicted in two dimensions, with edges of discrete lines, it is readily understood that, in practice, the protected volume 106 is a three dimensional volume with edges that fade out rather than discretely end. The protected volume 106 is designed to extend forward from the second side of the reference wall 102 by a predetermined depth 107 and may be defined by a surface 111, and/or a sweet spot. The sweet spot may be a planar area that is substantially parallel to the reference wall 102, and defined by its dimensions at the predetermined depth 107, (for example, a circumferential area or a height 109 and a width). The protected volume 106 comprises application specific characteristics, such as magnetic flux density and dimensions, which are based on one or more of the set including (i) predicted movement of the seat during its normal operation, (ii) the size, shape, and location, of a feature that is to be protected, and (iii) the material and thickness comprising the reference wall 102. In various embodiments, the characteristics of the protected volume 106 are further based on the characteristics of the one or more targets 14. In an embodiment, the predetermined depth is substantially 27 millimeters.

As shown in FIG. 4, the ferrous targets 304, 306, and 308 are strategically placed within the seat 130 so as to create the observable interference when the seat 130 is moved. For example, the seat 130 includes a head rest 110, a seat back 108, and a seat bottom 112. Each component of the seat 130 may be configured for a predictable amount of normal operational movement, wherein normal operational movement includes independent movement by a component of the seat 130, or joint movement by more than one component of the seat 130. For example, the normal operational movement of reclining a seat 130 generally causes the seat back 108 and the head rest 110 to move jointly. Herein, movement is further defined as being made up of one or more "manners of movement," wherein a "manner of movement" comprises movement along one generalized coordinate. For example, the normal operational movement of moving a seat 130 forward and rearward is movement of all of the seat 130 components, jointly, along one generalized coordinate, therefore one manner of movement of the seat 130; the normal operational movement of moving the seat bottom 112 up and down is movement of one seat component, individually, along another generalized coordinate, therefore another manner of movement of the seat 130. In FIG. 1, arrow 105 depicts the manner of movement commonly referred to as reclining, and arrow 103 depicts the manner of movement commonly referred to as rearward seat movement; a variety of manners of movement are supported. As mentioned above, sensing the seat movement is based on sensing a ferrous target 14 associated with the seat 130.

The kinematics of the normal operational movement of the components of seat 130 may be mapped to identify a target zone 310. The target zone 310 is the portion of the seat 130 that is predicted to make contact with the protected feature under normal operational movement of the seat 130 when the system 10 is not in place; accordingly, the target zone 310 is predicted to infringe upon the protected volume 106 under normal operational movement of the seat 130 when the system 10 is in place. The target zone 310 may comprise portions of more than one component of the seat 130. In FIG. 3, the target zone 310, shown with hatched fill, comprises a portion of head rest 110 and a portion of seat back 108. The target zone 310 may be described by dimensions, such as a height 202 and a width 302. In an embodiment, design margin may be added when mapping the seat kinematics, resulting in the target zone 310 also having a depth (not shown). One or more ferrous targets 14 may be mounted within the target zone 310. In FIG. 3, ferrous targets 304, 306, and 308 are shown in a straight line within the target zone 310. The dimensions of the ferrous target(s) 14, the number of ferrous targets 14, and the arrangement of the one or more ferrous targets 14 within the target zone 310, are application specific design decisions, based, at least in part, on the dimensions of the target zone 310 and the characteristics of the protected volume 106.

In various embodiments, movement of the seat 130 is caused by a mechanism 150. The mechanism 150 may comprise any combination of a lever, a motor, or other similar device, configured to cause one manner of movement for a component of the seat 130. The mechanism 150 may be controlled by the control module to control the movement of the seat.

Figure 5:
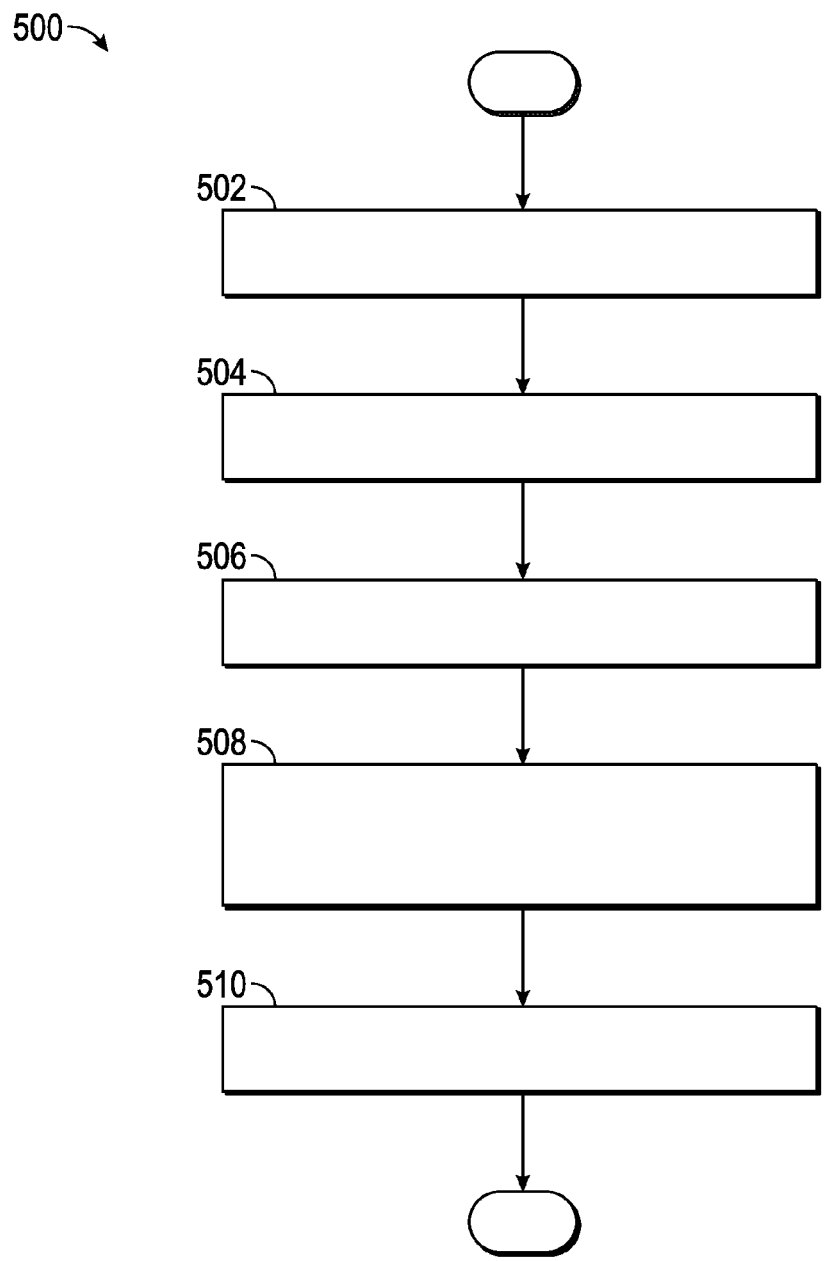
FIG. 5 is a flow chart describing a method for controlling movement of the moveable object, in accordance with various exemplary embodiments.

With reference now to FIG. 5 and with continued reference to FIGS. 1-4, a flowchart illustrates a method for controlling a moveable object 12 associated with a mobile platform that may be performed by the system 10 in accordance with various exemplary embodiments. As can be appreciated in light of the disclosure, the order of operation within the method is not limited to the sequential execution as illustrated in FIG. 5, but may be performed in one or more varying orders as applicable and in accordance with the present disclosure. As can further be appreciated, one or more steps of the method may be added or removed without altering the spirit of the method.

The method may start at 501. At 502, the protected volume 106 of magnetic flux is generated by the magnetic flux generation device 16. The at least one ferrous target 14 is arranged on the moveable object 12 at 504. At 506, the interference sensor device 18 senses interference in the magnetic flux comprising the protected volume 106. Sensing interference may comprise first determining a movement baseline, under which, movement of the object is permitted, and second, determining if the sensed interference indicates that movement exceeds the movement baseline. Responsive to the sensed interference at 506, the magnetic sensor module 122 determines that the moveable object 12 (seat 130) has infringed upon the protected volume 106. In an alternative, sensing interference at 506 may comprise first determining a direction of movement and then determining if the extent of movement in the sensed direction of movement is above a threshold.

At 508, the magnetic sensor module 122 determines a manner of movement of the moveable object 12 associated with the sensed infringement by the ferrous target 14. At 510, the magnetic sensor module 122 controls a mechanism 150 configured to cause the determined manner of movement of the moveable object 12. As mentioned above, when the moveable object 12 is the seat 130, the magnetic sensor module 122 is configured to control movement of the seat 130, via the mechanism 150, to minimize further infringement by the ferrous target 14 upon the protected volume 106. Minimizing further infringement by the ferrous target 14 upon the protected volume 106 may comprise any combination of: a complete stop of movement, a slowing of movement, and/or an incremental "inch along" movement. Minimizing further infringement results in protecting the protected feature from contact by the seat 130. In embodiments having a plurality of mechanisms 150 coupled to the seat 130, each mechanism 150 configured to cause a different manner of movement of the seat 130, the magnetic sensor module 122 is further configured to determine a manner of movement that initiated the sensed infringement, and control a specific mechanism 150 configured to cause the determined manner of movement While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for controlling movement of a seat in a vehicle, the method comprising:
    generating, by a magnetic sensor module within the vehicle, a protected volume of magnetic flux extending from a reference wall in the vehicle toward the seat by a predetermined depth;
    determining a movement baseline under which the seat is permitted to move;
    sensing, by the magnetic sensor module, infringement on the protected volume by the seat;
    determining that the sensed infringement indicates seat movement that exceeds the movement baseline and responsive thereto,
    controlling, by the magnetic sensor module, movement of the seat to minimize further infringement, wherein controlling movement of the seat includes slowing the seat movement and an incremental inch along movement.

2. The method of claim 1, further comprising:
    identifying a target zone as a portion of the seat that is predicted to infringe upon the protected volume during normal operation of the seat; and
    mounting a ferrous target within the target zone.

3. The method of claim 2, wherein identifying a target zone comprises mapping the kinetics of the seat.

4. The method of claim 2, wherein the ferrous target is one of a plurality of ferrous targets, and further comprising mounting each ferrous target of the plurality of ferrous targets within the target zone.

5. The method of claim 2, wherein controlling movement of the seat responsive to sensed infringement is based on minimizing infringement by the ferrous target upon the protected volume.

6. The method of claim 5, wherein controlling movement of the seat comprises controlling a mechanism configured to cause the seat to move.

7. The method of claim 6, wherein the mechanism is a motor, and wherein the motor is one of a plurality of motors, each motor configured to cause a different manner of movement of the seat, and further comprising:
    determining a manner of movement of the seat that initiated the infringement by the ferrous target upon the protected volume, and
    controlling a motor configured to cause the determined manner of movement.

8. The method of claim 5, wherein the predetermined depth is substantially 27 millimeters.

9. A system for controlling a moveable object in a mobile platform, the system comprising:
    a magnetic sensor assembly mounted to a reference wall of the mobile platform, the magnetic sensor assembly configured to
        generate a protected volume of magnetic flux, the protected volume extending forward from a surface of the reference wall by a predetermined depth;
        determine a movement baseline under which a ferrous target associated with the moveable object is permitted to move;
        sense infringement upon the protected volume by the ferrous target; and
        determine that the sensed infringement indicates movement of the moveable object that exceeds the movement baseline; and
    a control module coupled to the magnetic sensor assembly and to the moveable object, and configured to, responsive to the determination that the sensed infringement indicates movement of the moveable object that exceeds the movement baseline, control movement of the moveable object to minimize further infringement, wherein controlling movement of the moveable object includes slowing the movement of the moveable object and an incremental inch along movement of the moveable object.

10. The system of claim 9, wherein the ferrous target is mounted within a target zone, the target zone defining a portion of the moveable object that is predicted to infringe upon the protected volume during normal operation of the moveable object.

11. The system of claim 10, wherein the ferrous target is one of a plurality of ferrous targets, each mounted within the target zone.

12. The system of claim 10, further comprising a mechanism coupled to the seat and configured to cause the seat to move, and wherein the control module is further configured, responsive to the sensed infringement, to control the mechanism.

13. The system of claim 12, wherein predetermined depth is substantially 27 millimeters.

14. The system of claim 10, further comprising a plurality of motors coupled to the magnetic sensor assembly and to the seat, each motor configured to cause a different manner of movement of the seat, and wherein, responsive to sensed infringement, the control module is further configured to:
   determine a manner of movement that initiated the infringement; and
   control a motor configured to cause the determined manner of movement.

* * * * *